United States Patent [19]
Lang

[11] Patent Number: 5,975,644
[45] Date of Patent: Nov. 2, 1999

[54] GRINDER MIXER ASSEMBLY

[76] Inventor: William J. Lang, 2520 Glidden Rd., Beaverton, Mich. 48612

[21] Appl. No.: 08/900,162

[22] Filed: Jul. 28, 1997

[51] Int. Cl.⁶ ..................................................... E21B 25/06
[52] U.S. Cl. ........................ 299/39.4; 299/78; 144/24.12; 37/302
[58] Field of Search ...................... 299/39.4, 78; 404/91; 37/302, 903; 144/24.12

[56] References Cited

U.S. PATENT DOCUMENTS

| | | | |
|---|---|---|---|
| 3,754,603 | 8/1973 | Bogie | 172/45 |
| 4,041,996 | 8/1977 | Grover | 144/24.12 |
| 5,158,126 | 10/1992 | Lang | 144/375 |
| 5,259,692 | 11/1993 | Beller et al. | 299/39.4 X |
| 5,355,918 | 10/1994 | Lang | 144/24.12 |

OTHER PUBLICATIONS

ITEX Book Brochure "In–Situ Blending Systems" (Undated).

*Primary Examiner*—David Bagnell
*Assistant Examiner*—John Kreck
*Attorney, Agent, or Firm*—Reising, Ethington, Barnes, Kisselle, Learman & McCulloch, P.C.

[57] ABSTRACT

The grinder mixer assembly includes a drum assembly with end plates rotatably supported on stub shafts. These stub shafts are secured to arms of a yoke assembly. The spindle of a first hydraulic motor is secured to one of the stub shafts. The housing of the first motor is connected to a center portion of the drum by a key. The spindle of a second hydraulic motor is secured to the other stub shaft. The housing of the second motor is to a center portion of the drum by a key. The keys transmit torque from drive rings attached to each motor to driven rings attached to the drum mid way between the end plates of the drum.

15 Claims, 3 Drawing Sheets

5,975,644

GRINDER MIXER ASSEMBLY

This invention relates to a drum with external tool holders for holding tools that grind, crush, pulverize, blend and mix a variety of materials and more particularly to a drum with external tools driven by two hydraulic motors and mountable on an excavator.

BACKGROUND OF THE INVENTION

Stump grinders with drums with comminuting tools for pulverizing tree stumps in the ground and mixing the wood chips with soil can be used for many purposes other than tree stump eradication. They can for example grind hard material such as asphalt paving as well as breaking up sediment in a settling pond and then mixing the sediment with liquid to form a slurry. When the slurry is contaminated sludge, these drums can also mix materials with the slurry that will contain it or neutralize it. Another use for these drive drums with tools on their outer peripheries is the treatment of mine tailings.

My U.S. Pat. Nos. 5,158,126 and 5,355,918, the disclosures of which are incorporated herein by reference, disclose drums driven by a single hydraulic motor. These drums both have relatively short comminuting tools and tool holders that work well for tree stump eradication. When using a drum to treat other materials, different tools and tool holders may be more efficient. A longer drum with additional tools and tool holders can also improve performance for some tasks. It may also be desirable to supply more power to rotate the drum.

The hydraulic motor that drives the drum for a grinder mixer assembly should be protected from the materials being treated and should be isolated from loads that are not directly associated with the transmission of torque to drive the drum. Loads that shorten hydraulic motor life are loads that change the shape of the drum and cause misalignment between the motor housing and the motor spindle. Pressure on one side of the drum can distort the drum if the drum has insufficient strength. The drum can be distorted by the transmission of torque to the tools mounted on its outer periphery. The heat required to attach tool holders to the outer surface of the drum can also cause substantial drum distortion. Tool holders or tool holder attaching brackets are usually welded directly to the outer drum surface. Due to the large loads that may be applied to the tool holders, high heat is applied to the drum to weld the tool holders or tool holder attaching brackets in place. This heat can distort the drum and cause misalignment between a hydraulic motor housing and the motor spindle.

The length of the drum needs to be increased for some uses. With a long drum, potential problems due to torsional deflection of the drum increase. This potential problem increases as the distance along the axis of a drum from tools to the drive torque input to the drum increases. This is due in part to the fact that the tools on the side of the drum that is advancing toward material to be treated absorb most of the torque from the motor. If all the tools and tool holders were loaded equally, the torque would be distributed around the circumference of the drum and distortion of the drum due to the torque load on the drum would be minimized.

SUMMARY OF THE INVENTION

An object of the invention is to provide a grinder mixer assembly with a drum driven by two hydraulic motors. Another object of the invention is to provide a grinder mixer assembly with a drum that is driven in an area mid-way between the ends of the drum. A further object of the invention is to provide a driven drum with driven rings that are held in axial alignment with each other. A still further object of the invention is to provide a driven drum that includes two drum sections that are clamped together by fasteners.

The grinder mixer assembly has a yoke with a first yoke arm and a second yoke arm. A non-rotatable stub shaft is attached to each yoke arm. Drum end plates are rotatably journaled on the stub shafts and clamped to the drum by bolts. A central spindle of a hydraulic motor is connected to each stub shaft. Hydraulic motor housings are journaled on their spindles inside the drum. Passages through the stub shafts supply hydraulic fluid to passages in the hydraulic motor spindles and return hydraulic fluid from passages in the spindles to a sump.

A drive ring attached to one hydraulic motor housing transfers torque to a driven ring through keys. The driven ring is clamped to a first flange on the inside of the drum. Another drive ring is attached to the other hydraulic motor housing and transfers torque through keys to another driven ring clamped to a second flange on the inside of the drum. The first and second flanges are in a center portion of the drum. Axial alignment surfaces on the driven rings ensure that both driven rings are in axial alignment with each other.

The drum may include a single tubular member or it can be two tubular members clamped together to form one drum. If it is two tubular members the first flange is integral with one of the members and the second flange is integral with the other tubular member.

BRIEF DESCRIPTION OF THE DRAWINGS

The invention will now be explained in greater detail below with the aid of some embodiments which are illustrated in the accompanying drawing.

DESCRIPTION OF THE PREFERRED EMBODIMENTS

Figure 1:
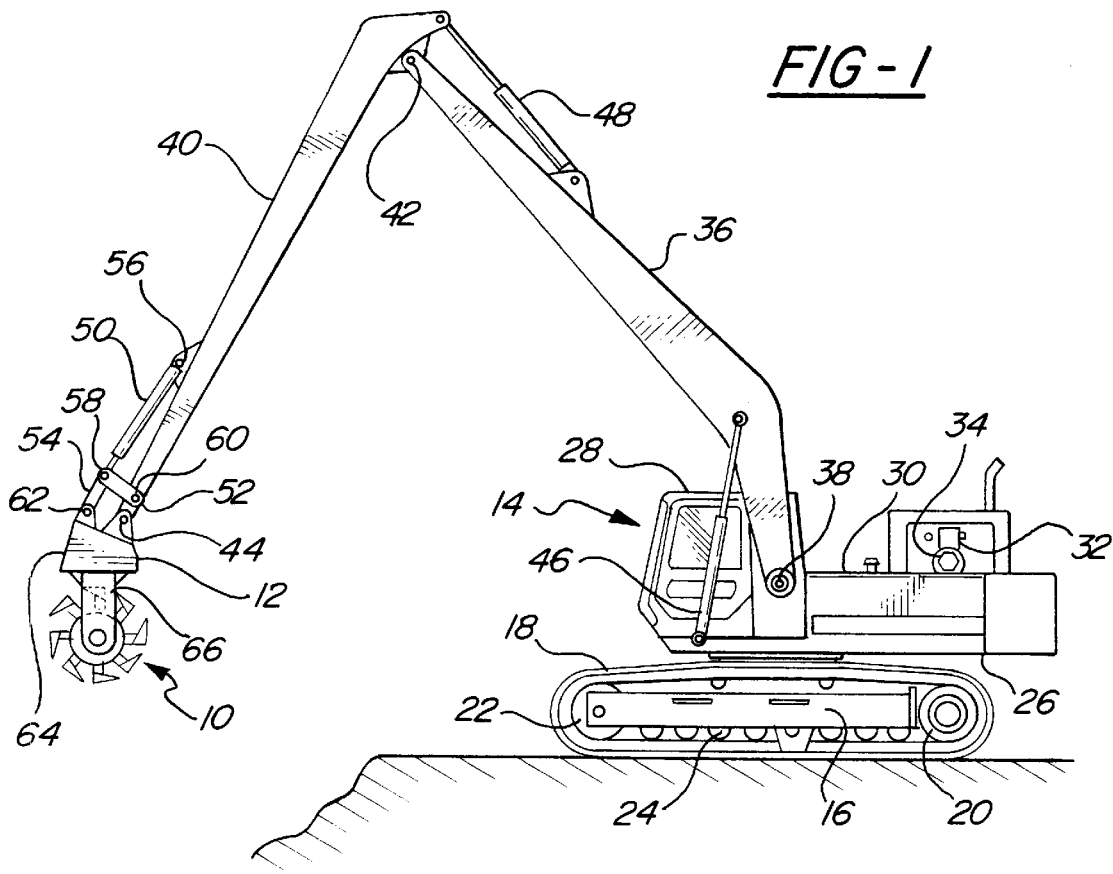
FIG. 1 is a side elevational view of a grinder mixer assembly mounted on an excavator.

The drum assembly 10 and the yoke assembly 12 are shown in FIG. 1 mounted on an excavator 14. The excavator 14 has a track frame assembly 16 with two continues tracks 18 trained around drive sprockets 20, idler wheels 22 and rollers 24. An excavator frame 26 is pivotally supported by the track frame assembly 16 for pivotal movement about a generally vertical axis. An operator's cab 28 is mounted on the excavator frame 26. An engine and hydraulic pump for driving the excavator are housed in an engine compartment 30. A second engine 32 and a hydraulic oil pump 34 for driving the drum assembly 10 is also mounted on the excavator frame 26. The drum assembly 10 generally requires the power provided by a large engine. However, the pump 34 can be driven by the engine in the engine compartment 30 if the engine has sufficient size to provide power for the excavator 14 and the drum assembly 10.

An excavator boom 36 is pivotally attached to the excavator frame 26 by a pivot pin 38. A stick 40 is pivotally attached to the free end of the boom 36 by a pivot pin 42. The yoke assembly 12 is pivotally attached to the lower end of the stick 40 by a pivot pin 44.

The boom 36 is pivoted about the pivot pin 38 by a hydraulic cylinder 46 to raise and lower the yoke 12. The stick 40 is pivoted about the pin 42 by a hydraulic cylinder 48 to move the yoke 12 toward and away from the excavator frame 26. A hydraulic cylinder 50 is connected to the stick 40 by a pin 56 and to a bar 52 and a bar 54 by a pin 58. The bar 52 is attached to the stick 40 by a pin 60. The bar 54 is connected to the yoke 12 by a pin 62. Extension and retraction of the cylinder 50 pivots the yoke 12 relative to the stick 40 about the pin 44.

The yoke 12 can be supported by machines other than an excavator 14 as described above. The yoke 12 could be mounted on a wheeled excavator, a backhoe, or suitable linkage mounted on some other vehicle.

The yoke 12 has a center portion 64 and a pair of arms 66 and 68. A first stub shaft 70 on the arm 66 and a second stub shaft 72 on the arm 68 rotateably support the drum assembly 10 between the arms.

The drum assembly 10 includes a cylindrical shell 74 with an internal end flange 76 on the left end and an internal flange 78 on the right end. A circular plate 80 is secured to the flange 76 by bolts 82. The flange 76 is inset from the end 84 of the cylindrical shell 74 to protect the plate 80. The bolts 82 are recessed into the plate 80 to provide additional protection from material being treated. A bearing hub 86 is mounted in a central bore 88 in the plate 80. Bolts 90 clamp the bearing hub 86 to the plate 80. An outer tapered roller bearing 92 and an inner tapered roller bearing 94 are pressed into the hub 86. The first stub shaft 70 is pressed into the bearings 92 and 94. A nut 96 screws onto the stub shaft 70 and sets the axial load on the tapered roller bearings 92 and 94. A spacer ring 98 is clamped between the nut 96 and the bearing 92. A seal contact ring 100 is clamped between the bearing hub 86 and the outer ring 102 by bolts 104. The outer periphery 106 of the spacer ring 98 is inside the seal contact ring 100. A seal guard 108 is attached to the spacer ring 98 by bolts 110 and retains a resilient seal with a V-shaped cross section in the cavity 112 where the seal makes sealing contact with and slides on the seal contact ring 100. A protector sleeve 114 is connected to the circular plate 80 by bolts 116 to protect the ring 102 and the seal contact ring 100. The end of the stub shaft 70 that extends outside the cylindrical shell 74 is held in a collar 118 secured to the arm 66 of the yoke 12 by bolts 120. A key 122 prevents the stub shaft 70 from rotating relative the collar 118. Note that the seal guard 108 is fixed with the stub shaft 70 and that the outer ring 102 rotates with the cylindrical shell 74.

The central spindle 124 of the left hydraulic motor 126 is positioned in an axial recess 128 in the center of the stub shaft 70 and is secured to the stub shaft by bolts 130. Passages 132 and 134 through the stub shaft 70 are connected to passages 136 and 138 in the central spindle 124 to supply hydraulic fluid under pressure to the left hydraulic motor 126 and to convey hydraulic fluid from the motor to a sump. High pressure hydraulic lines (not shown) connect the stub shaft 70 to the pump 34 and a sump for the pump.

A seal ring 140 is attached to the housing 142 of the motor 126 and seals against the walls of the bearing bore 141 in the bearing hub 86. The bearings 92 and 94 run in a lubricant that is held in by the seals described above. The seals also protect the bearings from contaminants.

A drive ring 144 is secured to the housing 142 of the motor 126 by bolts 146 that pass through the housing. The drive ring 144 is centered on the axis of the spindle 124 by a cylindrical surface 148 on the housing 142. A driven ring 150 is clamped to an internal flange 152 in the cylindrical shell 74 by bolts 154. Two or more keys 156 in key ways in the drive ring 144 and the driven ring 150 transmit torque to the cylindrical shell 74 from the motor 126. In the event of a torque overload, the keys 156 will shear to protect the system. Bolts 158 secure the keys 156 to the drive ring 144 to facilitate assembly.

A circular plate 160 is secured to the flange 78 by bolts 162. The flange 78 is inset from the end 164 of the cylindrical shell 74 to protect the plate 160. The bolts 162 are recessed into the plate 160 to provide additional protection from the material being treated. A bearing hub 166 is mounted in the central bore 168 in the plate 160. Bolts 170 clamp the bearing hub 166 to the plate 160. An outer tapered roller bearing 172 and an inner tapered roller bearing 174 are pressed into the hub 166. The second stub shaft 72 is pressed into the bearings 172 and 174. A nut 178 screws onto the stub shaft 72 and sets the axial load on the tapered roller bearings 172 and 174. A spacer ring 180 is clamped between the nut 178 and the bearing 172. A seal contact ring 182 is clamped between the bearing hub 166 and an outer ring 184 by bolts 186. The outer periphery 188 of the spacer ring 180 is inside the seal contact ring 182. A seal guard 190 is attached to the spacer ring 180 by bolts 192 and retains a resilient seal with a v-shape cross section in the cavity 194 where the seals makes sealing contact with and slides on the seal contact ring 182. A protector sleeve 196 is connected to the circular plate 160 by bolts 198 to protect the outer ring 184 and the seal contact ring 182. The end of the stub shaft 72, that extends outside the cylindrical shell 74, is held in a collar 200 secured to the arm 68 of the yoke 12 by bolts 202. A key 204 prevents the stub shaft 72 from rotating relative to the collar 200. Note that the seal guard 190 is fixed with the stub shaft 72 and that the outer ring 184 rotates with the cylindrical shell 74.

The central spindle 206 of the right hydraulic motor 208 is positioned in an axial recess 210 in the end of the stub shaft 72 and is secured to the stub shaft by bolts 212. Passages 214 and 216 through the stub shaft 72 are connected to passages 218 and 220 in the central spindle 206 to supply hydraulic fluid under pressure to the right hydraulic motor 208 and to convey hydraulic fluid from the motor to a sump. High pressure lines (not shown) connect the stub shaft 72 to the pump 34 and a sump for the pump.

A seal ring 222 is attached to the housing 224 of the motor 208 by bolts 225 and seals against the walls 227 of a bearing bore in the bearing hub 166. The bearings 172 and 174 run in lubricant that is held in by the seals described above. These seals also protect the bearings 172 and 174 from contaminants.

A drive ring 226 is secured to the housing 224 of the motor 208 by bolts 228 that pass through the housing. The drive ring 226 is centered on the axis of the spindle 206 by a cylindrical surface 230 on the housing 224. A driven ring 232 is clamped to an internal flange 234 in the cylindrical shell 74 by bolts 236. Two or more keys 238 in key ways in the drive ring 226 and the driven ring 232 transmit torque to the cylindrical shell 74 from the motor 208. In the event of a torque overload, the keys 238 will shear to protect the system. Bolts 240 secure the keys 238 to the drive ring 226 to facilitate assembly.

The driven ring 232 has a circular flange 242 that extends axially into a recess 244 in the driven ring 150. The cylindrical flange 242 ensures that the driven rings 150 and 232 are in axial alignment with each other.

The internal flanges 152 and 234 are slightly spaced apart from each other. These flanges 152 and 234 are also in the center portion of the cylindrical shell 74 and about midway between the internal flanges 76 and 78. In this position the maximum distance from tools mounted on the surface of the cylindrical shell 74 to the driven ring 150 or 232, is minimized even when only one hydraulic motor 126 or 208 is driving the cylindrical shell 74.

As shown in the drawing, there are two keys 156 spaced 180° apart transmitting torque from the left motor 126. There are also two keys 238 spaced 180° apart transmitting torque from the right motor 208. In view of the fact that each motor 126 or 208 can transmit over 20,000 foot pounds of torque it may be necessary to employ more than two keys 156 or 238 in each drive ring 144 or 226. Additional keys 156 and 238 can be added as required. However, the keys should be spaced to ensure that the force on the driven rings 150 and 232 are balanced about the axis of rotation.

Figure 2:
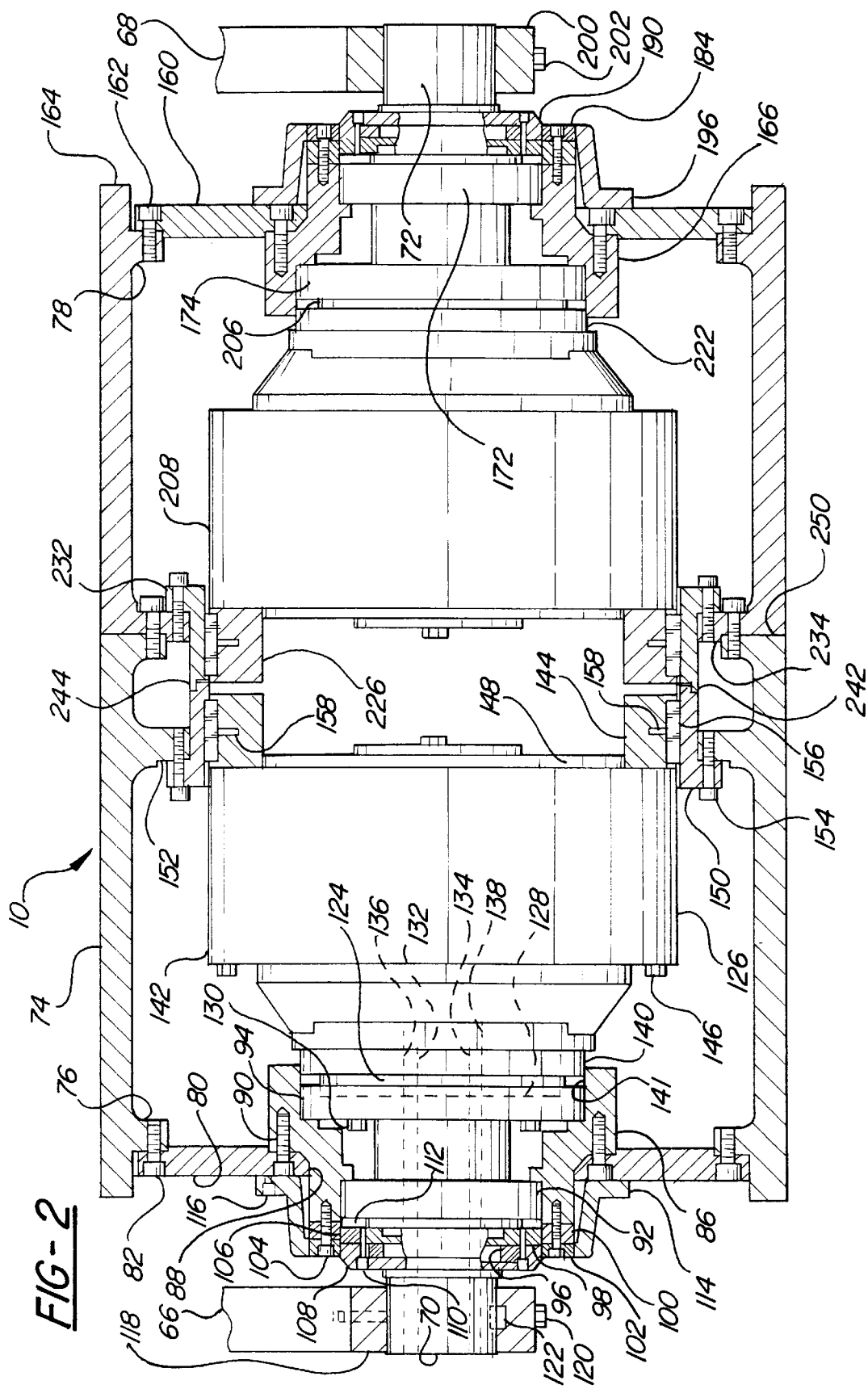
FIG. 2 is a sectional view of the drum assembly.
Figure 3:
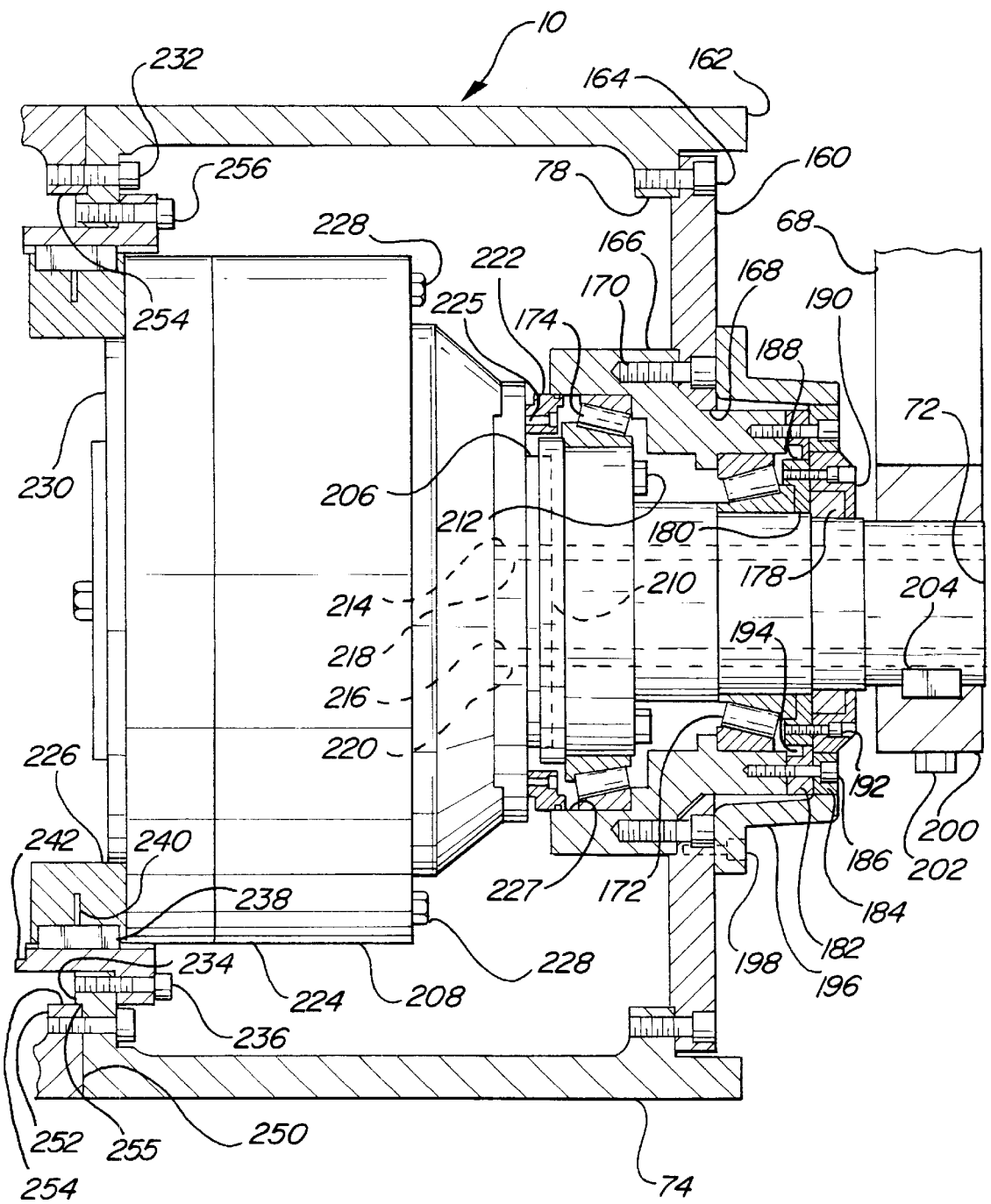
FIG. 3 is an enlarged sectional view of one end of the drum assembly.

A cylindrical shell 74 as described above is one piece. If desired the cylindrical shell 74 could be in two sections. A joint 250 can be provided as shown in FIGS. 2 and 3. This joint 250 includes a short flange 252 with a machined radially inward facing surface 254 that cooperates with machined surfaces 255 on the internal flange 234 to hold both ends of the shell 74 in axial alignment. Bolts 256 clamp the two sections of the cylindrical shell 74 together. The driven ring 150 is on one side of the joint 250 and the driven ring 232 is on the other side of the joint. This arrangement reduces the torque that is transmitted through the bolts 256 that clamp the two sections of the cylindrical shell 74 together. A two piece cylindrical shell 74 is easier to machine and it may be easier to ship.

The driven rings 150 and 232 form a ring assembly. As described above, torque is not transmitted directly between the driven ring 150 and the driven ring 232. This reduces the force on the bolts 256 that clamp the two sections of the cylindrical shell 74 together as explained above. If the cylindrical shell 74 is one piece, the driven rings 150 and 232 can be combined into a single driven ring.

Figure 4:
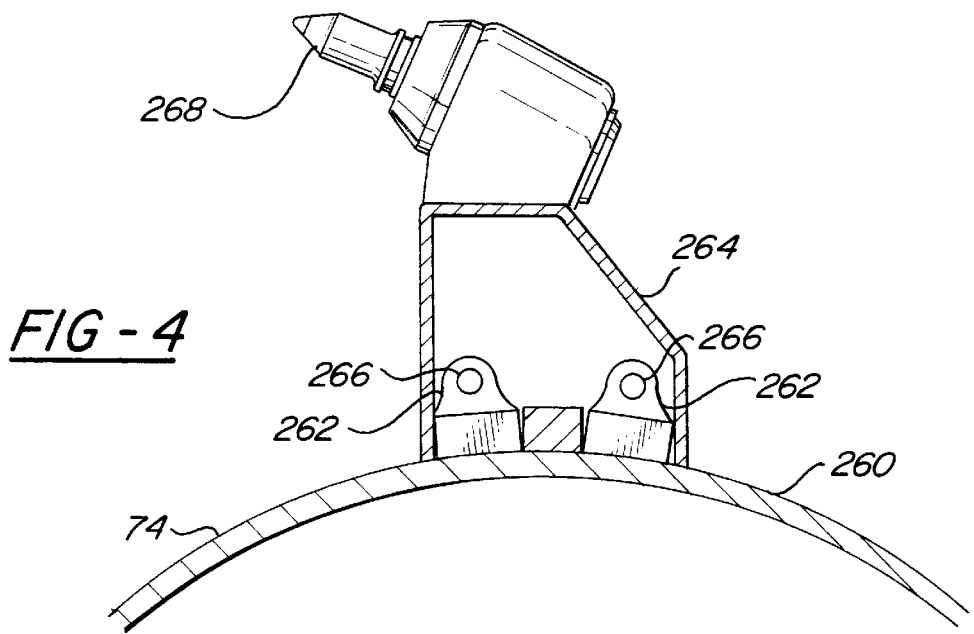
FIG. 4 is a sectional view of a tool holder and tool and a portion of the drum.

A wide variety of tools and tool holders are available for attachment to the outer surface of the drum assembly 10. The most common type includes a tool holder that is welded directly to the outer surface 260 of the cylindrical shell 74 of the drum assembly 10. As shown in FIG. 4, tool holder attaching brackets 262 are welded to the outer surface 260. A tool holder 264 covers and encloses two of the brackets 262. Two pin 266 secure each of the tool holders 264 to the attaching brackets 262. By designing the attaching brackets 262 so that they are subject to very little wear and the tool holder 264 and pins 266 wear, the need to cut the attaching brackets from the surface 260 and to weld new attaching brackets to the cylindrical shell 74 is reduced or eliminated. Welding on the cylindrical shell 74 can warp the drum assembly 10 and shorten the life of the hydraulic motors 126 and 208. Tool holders 264 of the desired length and shape, for the task to be undertaken, can be selected and attached to the attaching brackets 262. Tool bits 268 which are suitable for the task to be undertaken, are attached to the tool holders 264.

The invention has been described in detail in connection with a preferred embodiment. Some of the details will vary depending upon the material that is to be treated and the nature of the treatment. The preferred embodiment is therefore an example only and the invention is not restricted thereto. Those skilled in the art will understand that variations and modifications can be made within the scope of the invention.

I claim:

1. A grinder mixer assembly comprising a yoke with a first yoke arm and a second yoke arm; a first stub shaft nonrotatably attached to the first yoke arm; a second stub shaft nonrotatably attached to the second yoke arm; a drum with a central axis and two ends having one end journaled on the first stub shaft and the other end journaled on the second stub shaft and wherein the drum is rotatably supported by both the first and the second stub shafts for rotation about the central axis; a first hydraulic motor within the drum having a first spindle nonrotatably attached to the first stub shaft and a first motor housing rotatably mounted on said first spindle; a second hydraulic motor within the drum having a second spindle nonrotatably attached to the second stub shaft and a second motor housing rotatably mounted on said second spindle; a plurality of passages through the first stub shaft and the first spindle for supplying hydraulic fluid to the first hydraulic motor and for returning hydraulic fluid from the first hydraulic motor to a sump; a plurality of passages through the second stub shaft and the second spindle for supplying hydraulic fluid to the second hydraulic motor and for returning hydraulic fluid from the second hydraulic motor to the sump; a first motor drive ring attached to the first motor housing and at least one shear key that transmit torque from the first motor drive ring to the central portion of the drum; a second motor drive ring attached to the second motor housing and at least one shear key that transmits torque from the second motor drive ring to the central portion of the drum; and a plurality of tools secured to an outside surface of the drum.

2. A grinder mixer assembly as set forth in claim 1 including a first driven ring attached to an inside surface of the drum and having at least one key way that receives the at least one key that transmits torque from the first motor; and a second driven ring attached to the inside surface of the drum and having at least one key way that receives the at least one key that transmits torque from the second motor.

3. A grinder mixer assembly as set forth in claim 2 including at least one alignment surface on the first driven ring and at least one alignment surface on the second driven ring that cooperate to hold the first and second driven rings in axial alignment with each other.

4. A grinder mixer assembly as set forth in claim 2 wherein the first driven ring is secured to a first internal flange, the second driven ring is secured to a second internal flange and wherein the first and second internal flanges are in the central portion of the drum.

5. A grinder mixer assembly as set forth in claim 4 wherein the drum includes a first part and a second part connected together, the first internal flange is integral with one of the drum parts and the second internal flange is integral with the other drum part.

6. A grinder mixer assembly comprising a yoke with a first yoke arm and a second yoke arm; a first stub shaft nonrotatably attached to the first yoke arm; a second stub shaft nonrotatably attached to the second yoke arm; a drum with a central axis and two ends having one end journaled on the first stub shaft and the other end journaled on the second stub shaft and wherein the drum is rotatably supported by both the first and the second stub shafts for rotation about the central axis; a driven ring assembly concentric with the central axis and secured to the inside of the drum and substantially centered between the two ends of the drum; a first hydraulic motor mounted in the drum and attached to the first stub shaft and the driven ring assembly to rotate the drum relative to the central axis; a plurality of passages through one of the stub shafts for supplying hydraulic fluid to the first hydraulic motor and for returning hydraulic fluid from the first hydraulic motor to a sump; a second hydraulic motor mounted in the drum and attached to one of said stub shafts and the driven ring assembly to rotate the drum relative to the central axis; and a plurality of tools secured to an outside surface of the drum.

7. A grinder mixer assembly as set forth in claim 6 wherein the second hydraulic motor is attached to the second stub shaft.

8. A grinder mixer assembly as set forth in claim 7 wherein the passages supplying hydraulic fluid to the first hydraulic motor and for returning hydraulic fluid from the first hydraulic motor to the sump are in the first stub shaft; and including a plurality of passages through the second stub shaft for supplying hydraulic fluid to the second hydraulic motor and for returning hydraulic fluid from the second hydraulic motor to the sump.

9. A grinder mixer assembly as set forth in claim 6 wherein the first hydraulic motor has a spindle attached to the first stub shaft and a first motor housing mounted on the spindle and attached to the driven ring assembly.

10. A grinder mixer assembly as set forth in claim 9 including a drive ring attached to the first motor housing, concentric with the driven ring assembly and secured to the driven ring assembly by a key.

11. A grinder mixer assembly as set forth in claim 6 wherein the first hydraulic motor has a first spindle attached to the first stub shaft and a first motor housing mounted on the first spindle and attached to the driven ring assembly; and the second hydraulic motor has a second spindle attached to the second stub shaft and a second motor housing mounted on the second spindle and attached to the driven ring assembly.

12. A grinder mixer assembly as set forth in claim 11 including a first drive ring attached to the first motor housing, concentric with the driven ring assembly and secured to the driven ring assembly by at least one first key; and a second drive ring attached to the second motor housing, concentric with the driven ring assembly and secured to the driven ring assembly by at least one second key.

13. A grinder mixer assembly as set forth in claim 12 including at least two first keys that transmit torque from the first drive ring to the driven ring assembly; and at least two second keys that transmit torque from the second drive ring to the driven ring assembly.

14. A grinder mixer assembly comprising a yoke with a first yoke arm and a second yoke arm; a first stub shaft nonrotatably attached to the first yoke arm; a second stub shaft nonrotatably attached to the second yoke arm; a drum with a central axis and two ends having one end journaled on the first stub shaft and the other end journaled on the second stub shaft and wherein the drum is rotatably supported by both the first and the second stub shafts for rotation about the central axis; a first driven ring concentric with the central axis and secured to the inside of the drum adjacent to a first side of a plane through the center of the drum and transverse to the central axis; a first hydraulic motor mounted in the drum and attached to the first stub shaft and the first driven ring to rotate the drum relative to the central axis; a plurality of passages through the first stub shaft for supplying hydraulic fluid to the first hydraulic motor and for returning hydraulic fluid from the first hydraulic motor to a sump; a second driven ring concentric with the central axis and secured to the inside of the drum adjacent to a second side of said plane and to the first driven ring; a second hydraulic motor mounted in the drum and attached to one of said stub shafts and the second driven ring to rotate the drum relative to the central axis; and a plurality of tools secured to an outside surface of the drum.

15. A grinder mixer assembly as set forth in claim 14 having passages through the second stub shaft for supplying hydraulic fluid to the second hydraulic motor.

* * * * *